US011342575B2

(12) United States Patent
Woo et al.

(10) Patent No.: US 11,342,575 B2
(45) Date of Patent: May 24, 2022

(54) FUEL CELL STACK (71) Applicant: LG Electronics Inc., Seoul (KR)

(72) Inventors: Hyoungsuk Woo, Seoul (KR);
Dongkeun Yang, Seoul (KR);
Jaeyoung Won, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/999,503

(22) Filed: Aug. 21, 2020

(65) Prior Publication Data
US 2021/0057773 A1 Feb. 25, 2021

(30) Foreign Application Priority Data

Aug. 23, 2019 (KR) .......................... 10-2019-0103762

(51) Int. Cl.
H01M 8/2483 (2016.01)
H01M 8/0267 (2016.01)
(52) U.S. Cl.
CPC ....... *H01M 8/2483* (2016.02); *H01M 8/0267* (2013.01)

(58) Field of Classification Search
CPC .......................... H01M 8/2483; H01M 8/0267
See application file for complete search history.

(56) References Cited

U.S. PATENT DOCUMENTS

2006/0240302 A1* 10/2006 Senner ................. H01M 8/241
429/414
2008/0152987 A1* 6/2008 Nakashima ....... H01M 8/04089
429/414

* cited by examiner

*Primary Examiner* — Olatunji A Godo
(74) *Attorney, Agent, or Firm* — Fish & Richardson P.C.

(57) ABSTRACT

A fuel cell stack includes a first stack including a plurality of first fuel cells stacked on each other, and a second stack including a plurality of second fuel cells stacked on each other and disposed on one side of the first stack. Each of the first stack and the second stack includes a fuel inlet hole, through which fuel to be supplied to anodes of the respective first and second fuel cells is introduced, a fuel discharge hole, through which the fuel passing through the anodes is discharged, an air inlet hole, through which air to be supplied to cathodes of the respective first and second fuel cells is introduced, and an air discharge hole, through which the air passing through the cathodes is discharged. The fuel cell stack divided into the two stacks increases a charging ratio of hydrogen at the anodes of the respective stacks.

17 Claims, 5 Drawing Sheets

| Case | NUMBER OF FUEL CELLS | | OPERATING CONDITION | | | |
|---|---|---|---|---|---|---|
| | | | OUTPUT POWER(kW) | | STOICHIOMETRY | |
| | FIRST STACK | SECOND STACK | FIRST STACK | SECOND STACK | FIRST STACK | SECOND STACK |
| 0 | 150 | 0 | 6.2 | 0 | 1.23 | – |
| 1 | 140 | 10 | 5.8 | 0.4 | 1.32 | 4.50 |
| 2 | 130 | 20 | 5.4 | 0.8 | 1.42 | 2.75 |
| 3 | 120 | 30 | 5.0 | 1.2 | 1.54 | 2.17 |
| 4 | 110 | 40 | 4.5 | 1.7 | 1.68 | 1.88 |
| 5 | 105 | 45 | 4.3 | 1.9 | 1.76 | 1.78 |
| 6 | 100 | 50 | 4.1 | 2.1 | 1.85 | 1.70 |
| 7 | 90 | 60 | 3.7 | 2.5 | 2.06 | 1.58 |
| 8 | 80 | 70 | 3.3 | 2.9 | 2.31 | 1.50 |
| 9 | 75 | 75 | 3.1 | 3.1 | 2.47 | 1.47 |

FUEL CELL STACK

CROSS-REFERENCE TO RELATED APPLICATION

This application claims the priority from Korean Patent Application No. 10-2019-0103762, filed on Aug. 23, 2019, the disclosure of which is incorporated herein by reference in its entirety.

BACKGROUND OF THE INVENTION

1. Field of the Invention

The present disclosure relates to a fuel cell stack, and more particularly to a fuel cell stack which is divided into two stacks, such that a hydrogen charging ratio at the anode may increase.

2. Description of the Related Art

A fuel cell device is an electrochemical device that produces electricity by an electrochemical reaction between hydrogen, obtained by reforming hydrocarbon fuel, and oxygen in the air in a Membrane Electrode Assembly (MEA) of the stack. While the fuel cell device is in operation, water and heat are generated.

The fuel cell device includes a reformer for reforming supplied fuel, a burner for supplying heat required for a reforming reaction, a heat exchanger and a coolant pipe for recovering heat and cooling the stack, a power converter for converting produced direct current power into alternating current power, and the like.

Inside a case of the fuel cell device, various individual components, and pipes for allowing the flow of fluids (e.g., air, fuel, and water) therebetween, are arranged in a complicated manner.

Korean Laid-open Patent Publication No. 10-2012-0071288 discloses a fuel cell device (see FIG. 1) having a stack module 10 including: a stack 10A having fuel cells, which are stacked on top of each other, and producing electricity; a power converter 10B for converting direct current power, produced by the stack 10A, into alternating current power; and an ultrapure water heat exchanger 10C in which ultrapure water for cooling the stack 10A circulates.

Figure 1:
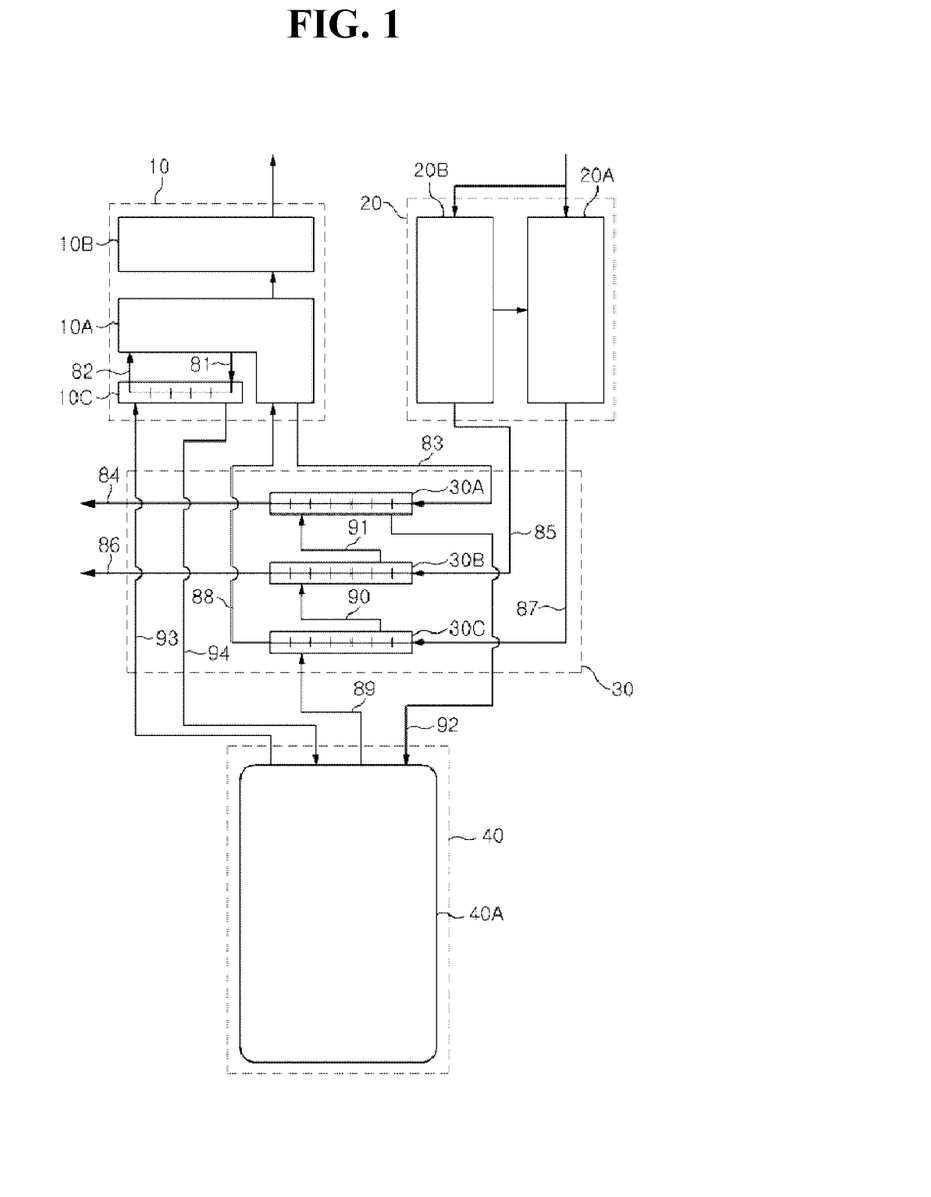
FIG. 1 is a diagram illustrating an example of a fuel cell system according to a general technique.

A fuel converter module 20 includes a reformer 20A for converting supplied fuel into a hydrogen gas, and a burner 20B for supplying heat required for a reforming reaction to the reformer 20A.

A BOP module 30 includes: a first heat exchanger 30A for recovering heat from an exhaust gas of the stack 10A; a second heat exchanger 30B for recovering heat from an exhaust gas of the burner 20B; and a third heat exchanger 30C for recovering heat from the hydrogen gas discharged from the reformer 20A.

A heat storage module 40 includes a hot water tank 40A which recovers and stores heat by circulating stored water through the ultrapure water heat exchanger 10C, the first heat exchanger 30A, the second heat exchanger 30B, and the third heat exchanger 30C of the stack module 10. That is, the hot water tank 40A performs a heat storage function.

A stack exhaust gas inlet pipe 83 is connected between an exhaust gas outlet of the stack 10A and a core inlet of the first heat exchanger 30A, and a stack exhaust has discharge pipe 84 is connected to a core outlet of the first heat exchanger 30A.

A hydrogen gas inlet pipe 87 is connected between a hydrogen gas outlet of the reformer 20A and a core inlet of the third heat exchanger 30A, and a hydrogen gas discharge pipe 88 is connected between a core outlet of the third heat exchanger 30A and a hydrogen gas inlet of the stack 10A.

However, when the stack 10A, included in the fuel cell device, is formed with one layer on which a plurality of fuel cells are stacked on top of each other, there is a problem in that a charging ratio of hydrogen is reduced with respect to an equal amount of hydrogen.

Furthermore, there is also a problem in that as the operating time of the fuel cell device is accumulated, power generation performance is degraded due to the reduced hydrogen charging ratio.

Moreover, in order to supplement the reduced hydrogen charging ratio by increasing an amount of hydrogen supplied to the stack 10A, the reformer 20A is required to have a large capacity, but a large-capacity reformer has problems in that system construction costs increase, and the fuel cell system occupies a larger volume.

SUMMARY

It is a first object of the present disclosure to provide a fuel cell stack, in which a cell voltage of the stack may increase by increasing a charging ratio of hydrogen at the anode.

It is a second object of the present disclosure to provide a fuel cell stack, in which by dividing the fuel cell stack into two stacks, uniform performance may be achieved on each of the stacks.

It is a third object of the present disclosure to provide a fuel cell stack, in which power consumption of a Balance of Plant module (particularly blower) may be reduced by reducing resistance at the cathode of the system, thereby improving efficiency of the fuel cell system.

The objects of the present disclosure are not limited to the aforementioned objects and other objects not described herein will be clearly understood by those skilled in the art from the following description.

In accordance with an aspect of the present disclosure, the above and other objects can be accomplished by providing a fuel cell stack, including: a first stack including a plurality of first fuel cells which are stacked on top of each other; and a second stack including a plurality of second fuel cells which are stacked on top of each other, and being disposed on one side of the first stack, wherein each of the first stack and the second stack includes: a fuel hole having a fuel inlet hole, through which fuel to be supplied to anodes of the respective first and second fuel cells is introduced, and a fuel discharge hole, through which the fuel passing through the anodes is discharged; and an air hole having an air inlet hole, through which air to be supplied to cathodes of the respective first and second fuel cells is introduced, and an air discharge hole, through which the air passing through the cathodes is discharged. Accordingly, by dividing the fuel cell stack into two stacks, a charging ratio of hydrogen at the anodes of the respective stacks may be increased.

The first stack may include a first cell housing, in which the first fuel cells are received, and a first end plate being connected to the first cell housing, and having the fuel hole and the air hole of the first stack which are formed on one side of the first end plate; and the second stack may include a second cell housing, in which the second fuel cells are received, and a second end plate being connected to the second cell housing, and having the fuel hole and the air hole of the second stack which are formed on one side of the second end plate.

In this case, the first stack may be disposed below the second stack; and a number of the first fuel cells may be greater than a number of the second fuel cells by a predetermined ratio.

The fuel inlet hole of the fuel hole of the first stack (hereinafter referred to as a first fuel inlet hole) may be disposed adjacent to the air inlet hole of the air hole of the first stack (hereinafter referred to as a first air inlet hole); the fuel discharge hole of the fuel hole of the first stack (hereinafter referred to as a first fuel discharge hole) may be disposed adjacent to the air discharge hole of the air hole of the first stack (hereinafter referred to as a first air discharge hole); the fuel inlet hole of the fuel hole of the second stack (hereinafter referred to as a second fuel inlet hole) may be disposed adjacent to the air inlet hole of the air hole of the second stack (hereinafter referred to as a second air inlet hole); and the fuel discharge hole of the fuel hole of the second stack (hereinafter referred to as a second fuel discharge hole) may be disposed adjacent to the air discharge hole of the air hole of the second stack (hereinafter referred to as a second air discharge hole).

Each of the first air inlet hole and the second air inlet hole may be disposed above the first air discharge hole and the second air discharge hole, respectively. Further, the first air inlet hole and the second air inlet hole may communicate with each other through an air supply pipe, in which the air supplied to the cathodes flows; and the first air discharge hole and the second air discharge hole may communicate with each other through an air discharge pipe, in which the air passing through the cathodes flows.

The first fuel discharge hole and the second fuel inlet hole may communicate with each other through a connection pipe, in which fuel discharged from the first fuel discharge hole flows.

Other unmentioned technical solutions can be clearly understood from the following description by those having ordinary skill in the technical field to which the present disclosure pertains.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Advantages and features of the present disclosure and methods for accomplishing the same will be more clearly understood from exemplary embodiments described below with reference to the accompanying drawings. However, the present disclosure is not limited to the following embodiments but may be implemented in various different forms. The embodiments are provided only to complete disclosure of the present disclosure and to fully provide a person having ordinary skill in the art to which the present disclosure pertains with the category of the present disclosure, and the present disclosure will be defined by the scope of the appended claims. Wherever possible, like reference numerals generally denote like elements through the specification.

Figure 3:
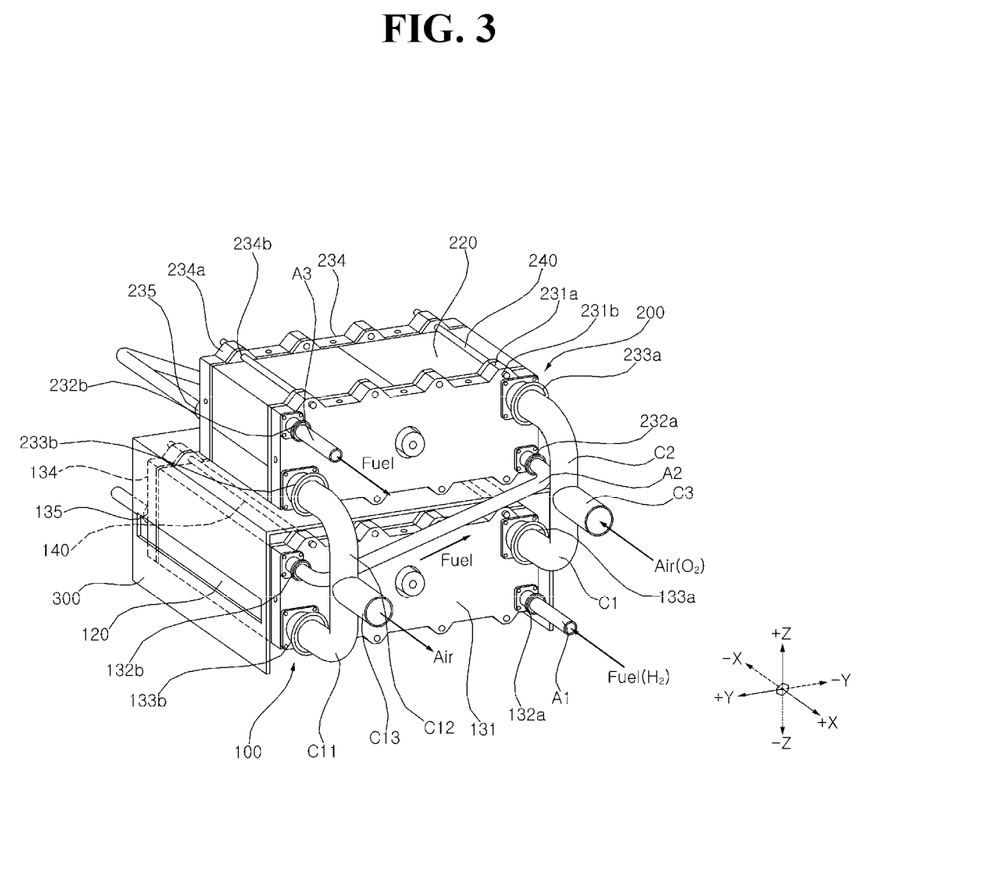
FIG. 3 is a perspective view of a fuel cell stack according to an embodiment of the present disclosure.

The present disclosure may also be described based on a spatial orthogonal coordinate system with X, Y and Z axes mutually crossing at right angles, as illustrated in FIG. 3. In the present disclosure, the X, Y and Z axes are defined based on a Z axis direction being defined as an up-down direction and an X axis direction being defined as a front-rear direction. Each axis direction (X-, Y-, and Z-axis directions) may indicate both directions in which each of the axes extends; and +X-, +Y-, and +Z-axis directions having a plus sign ("+") may indicate a positive direction, which is either one of both directions in which each of the axes extends. Further, −X-, −Y-, and −Z-axis directions having a minus sign ("−") may indicate a negative direction, which is the other one of both directions in which each of the axes extends.

The present disclosure relates to a fuel cell stack included in a fuel cell device to produce power, and the fuel cell stack may include a plurality of fuel cells which are stacked on top of each other. In this case, each of the plurality of fuel cells may include a Membrane Electrode Assembly (MEA) formed by sandwiching an electrolyte membrane between an anode and a cathode.

A reaction occurs when fuel, such as hydrogen gas, is oxidized at the anode and oxygen is reduced at the cathode, and electrical energy is produced by the movement of electrons generated by this reaction.

Generally, by considering that performance of the fuel cells may be reduced as usage time of the fuel cells increases, a greater amount of hydrogen is supplied to the fuel cell stack than an actually required amount for reaction. That is, assuming that an end of life (EOL) of the fuel cell stack is about 80% of a beginning of life (BOL), hydrogen is fed to the fuel cell stack in an amount of about 20% more than an actually required amount for reaction, as a countermeasure against reduction in performance of the fuel cells.

In other words, increasing a charging ratio of hydrogen in the fuel cell stack may be a method of increasing a cell voltage of the stack or improving performance of the fuel cells, and a general fuel cell stack will be described below in this regard.

Figure 2:
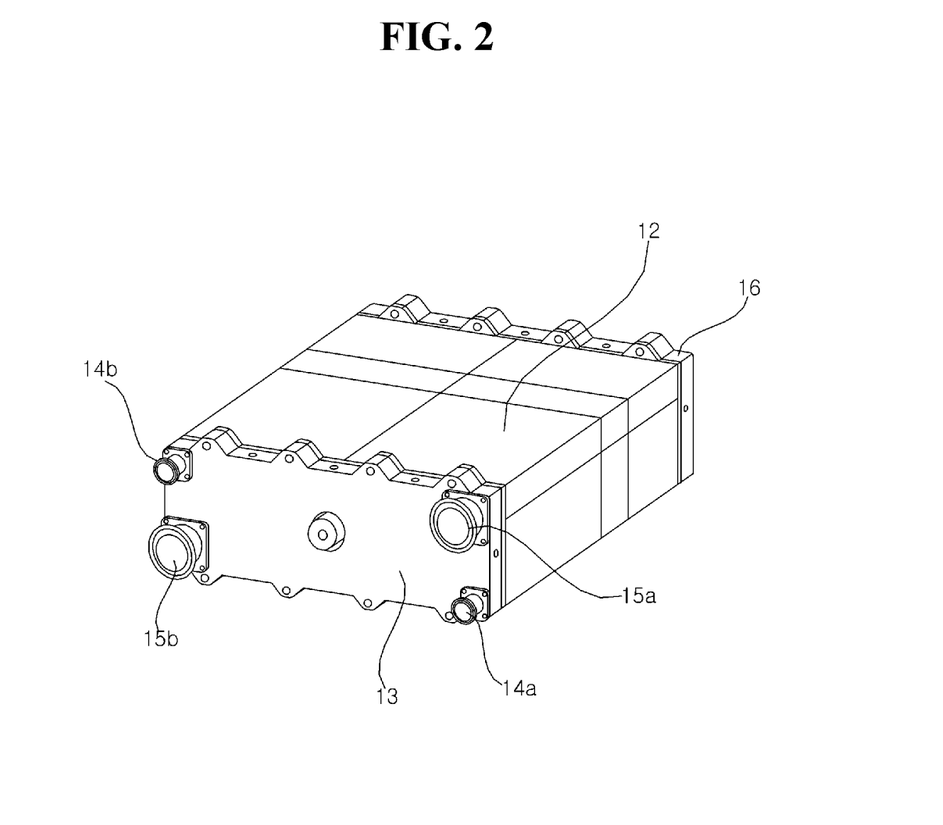
FIG. 2 is a diagram illustrating an example of a fuel cell stack according to a general technique.

FIG. 2 is a diagram illustrating an example of a fuel cell stack according to a general technique.

Referring to FIG. 2, the fuel cell stack according to the general technique has one layer including a cell housing 12, in which a plurality of fuel cells 11 are received, and a pair of end plates 13 and 16 connected to both ends of the cell housing 12.

The aforementioned chemical reaction may occur in such a manner that hydrogen, introduced through a fuel inlet hole 14a formed in the end plate 13, is supplied to an anode of each of the plurality of fuel cells 11; and air, introduced through an air inlet hole 15a formed in the end plate 13, is supplied to a cathode of each of the plurality of fuel cells 11.

The fuel, passing through the anode, is discharged outside of the stack through a fuel discharge hole 14b formed in the end plate 13; and the air, passing through the cathode, is discharged outside of the stack through an air discharge hole 15b.

In this case, the general fuel cell stack is formed with one layer, such that in order to increase a charging ratio of hydrogen in the fuel cell stack, a reformer 400 for converting the supplied fuel into hydrogen gas is required to have a large capacity.

However, a large-capacity reformer has problems in that system construction costs increase, and the fuel cell system occupies a larger volume. Accordingly, in order to solve the above problems of the general fuel cell system, the present disclosure provides a fuel cell stack in a cascade stack structure, which will be described in detail below.

FIG. 3 is a perspective view of a fuel cell stack according to an embodiment of the present disclosure.

Referring to FIG. 3, the fuel cell stack according to an embodiment of the present disclosure includes a first stack 100 and a second stack 200. That is, the fuel cell stack is divided into two stacks. In this manner, compared to a case where a predetermined number of fuel cells are provided for a one-layer stack, the fuel cells may be divided and provided separately for two stacks, thereby reducing a number of fuel cells provided per stack and effectively reducing flooding in the fuel cell stack. Here, the flooding is a phenomenon in which water, formed as a result of the chemical reaction, is accumulated in the stack without being discharged to the outside, thereby reducing diffusion of the fuel (hydrogen) and causing reduction in the performance of the fuel cells.

The first stack 100 includes a plurality of first fuel cells 110 which may be stacked on top of each other. The second stack 100 includes a plurality of second fuel cells 210 which may be stacked on top of each other. For example, the first stack 100 may be disposed below the second stack 200 (i.e., −Z axis direction).

The first stack 100 may include a fuel hole 132 having a fuel inlet hole 132a, through which fuel (e.g., hydrogen) to be supplied to anodes of the first fuel cells 110 is introduced, and a fuel discharge hole 132b, through which the fuel passing through the anodes, is discharged.

The first stack 100 may include an air hole 133 having an air inlet hole 133a, through which air (e.g., oxygen) to be supplied to cathodes of the first fuel cells 110 is introduced, and an air discharge hole 133b, through which the air passing through the cathodes is discharged.

The second stack 200 may include a fuel hole 232 having a fuel inlet hole 232a, through which fuel (e.g., hydrogen) to be supplied to anodes of the second fuel cells 210 is introduced, and a fuel discharge hole 232b, through which the fuel passing through the anodes, is discharged.

The second stack 200 may include an air hole 233 having an air inlet hole 233a, through which air (e.g., oxygen) to be supplied to cathodes of the second fuel cells 210 is introduced, and an air discharge hole 233b, through which the air passing through the cathodes is discharged.

The first stack 100 may include a first cell housing 120 and first end plates 131 and 134. The first fuel cells 110 may be received inside the first cell housing 120. The first cell housing 120 may be shaped like a rectangular box but is not limited thereto. The first end plates 131 and 134 may include a pair of first end plates 131 and 134 which are connected to both ends of the first cell housing 120.

The pair of first end plates 131 and 134 may be connected integrally to each other by a plurality of first connecting bars 140. To this end, the pair of first end plates 131 and 134 may have a plurality of first coupling holes 131b and 134b, to which each of the plurality of first connecting bars 140 is coupled. In this case, the first coupling holes 131b and 134b may be formed on inner surfaces of projecting portions 131a and 134a which project from one side of the first end plates 131 and 134. That is, as the first connecting bars 140 are coupled (e.g., screw-coupled) to the first coupling holes 131b and 134b of each of the pair of first end plates 131 and 134, the pair of first end plates 131 and 134 may be integrally connected to each other. In this manner, the pair of first end plates 131 and 134 may cover or seal the first fuel cells 110 from the outside environment along with the first cell housing 120.

The second stack 200 may include a second cell housing 220 and second end plates 231 and 234. The second fuel cells 210 may be received inside the second cell housing 220. Similarly to the first cell housing 120, the second cell housing 220 may also be shaped like a rectangular box but is not limited thereto. The second end plates 231 and 234 may include a pair of second end plates 231 and 234 which are connected to both ends of the second cell housing 220.

The pair of second end plates 231 and 234 may be connected integrally to each other by a plurality of second connecting bars 240. To this end, the pair of second end plates 231 and 234 may have a plurality of second coupling holes 231b and 234b, to which each of the plurality of second connecting bars 240 is coupled. In this case, the second coupling holes 231b and 234b may be formed on inner surfaces of projecting portions 231a and 234a which project from one side of the second end plates 231 and 234. That is, as the second connecting bars 140 are coupled (e.g., screw-coupled) to the second coupling holes 231b and 234b of each of the pair of second end plates 231 and 234, the pair of second end plates 231 and 234 may be integrally connected to each other. In this manner, the pair of second end plates 231 and 234 may cover or seal the second fuel cells 210 from the outside environment along with the second cell housing 220.

Further, depending on embodiments, at least some of the plurality of first coupling holes 131b and 134b may be disposed to face at least some of the plurality of second coupling holes 231b and 234b, such that any one of the first connecting bar 140 and the second connecting bar 240 may be coupled thereto. In this manner, the first stack 1 and the second stack 200 may be integrally connected to each other by the coupling hole-connecting bar connection.

However, depending on embodiments, without the coupling hole-connecting bar connection, only a holder 300 may be further included, which is disposed between the first stack 100 and the second stack 200 and supports the second stack 200. In this case, the holder 300 may have a rectangular U-shape formed by bending a plate at least twice, but the shape is not limited thereto.

In addition, the fuel hole 232 and the air hole 233 of the second stack 200 may be formed on a side surface of the second end plate 231, which is adjacent to a side surface of the first end plate 131 on which the fuel hole 132 and the air hole 133 of the first stack 100 are formed. For example, the fuel hole 132 and the air hole 133 of the first stack 100 may be formed in the first end plate 131, which is formed on one side (i.e., +X axis direction) of the pair of first end plates. In this case, the fuel hole 232 and the air hole 233 of the second stack 200 may be formed in the second end plate 231, which is formed on one side (i.e., +X axis direction) of the pair of second end plates.

The fuel inlet hole 132a of the fuel hole 132 of the first stack 100 (hereinafter referred to as a first fuel inlet hole) may be positioned adjacent to the air inlet hole 133a of the air hole 133 of the first stack 100 (hereinafter referred to as a first air inlet hole). For example, the first fuel inlet hole 132a and the first air inlet hole 133a may be spaced apart from each other by a predetermined distance in an up-down direction (i.e., Z axis direction) at one end (i.e., end portion in the −Y axis direction) of the first end plate 131.

The fuel discharge hole 132b of the fuel hole 132 of the first stack 100 (hereinafter referred to as a first fuel discharge hole) may be positioned adjacent to the air discharge hole 133b of the air hole 133 of the first stack 100 (hereinafter referred to as a first air discharge hole). For example, the first fuel discharge hole 132b and the first air discharge hole 133b may be spaced apart from each other by a predetermined distance in an up-down direction (i.e., Z axis direction) at one end (i.e., end portion in the +Y axis direction) of the first end plate 131.

That is, supply of air and fuel to the first stack 100 and discharge of the air and fuel from the first stack 100 are provided at adjacent positions, such that the air and fuel may flow smoothly through the first fuel cells 110, thereby effectively improving performance of the stack.

The fuel inlet hole 232a of the fuel hole 232 of the second stack 200 (hereinafter referred to as a second fuel inlet hole) may be positioned adjacent to the air inlet hole 233a of the air hole 233 of the second stack 200 (hereinafter referred to as a second air inlet hole). For example, the second fuel inlet hole 232a and the second air inlet hole 233a may be spaced apart from each other by a predetermined distance in an up-down direction (i.e., Z axis direction) at one end (i.e., end portion in the −Y axis direction) of the second end plate 231.

The fuel discharge hole 232b of the fuel hole 232 of the second stack 200 (hereinafter referred to as a second fuel discharge hole) may be positioned adjacent to the air discharge hole 233b of the air hole 233 of the second stack 200 (hereinafter referred to as a second air discharge hole). For example, the second fuel discharge hole 232b and the second air discharge hole 233b may be spaced apart from each other by a predetermined distance in an up-down direction (i.e., Z axis direction) at the other end (i.e., end portion in the +Y axis direction) of the second end plate 231.

That is, supply of air and fuel to the second stack 200 and discharge of the air and fuel from the second stack 200 are provided at adjacent positions, such that the air and fuel may flow smoothly through the second fuel cells 210, thereby effectively improving performance of the stack.

In addition, the first air inlet hole 133a may be disposed above (i.e., +Z axis direction) the first air discharge hole 133b, and the second air inlet hole 233a may be disposed above (i.e., +Z axis direction) the second air discharge hole 233b. In this arrangement, condensate water, formed in each of the first stack 100 and the second stack 200, may be discharged easily through the first air discharge hole 133b and the second air discharge hole 233b, respectively.

The first air inlet hole 133a and the second air inlet hole 233a may communicate with each other through an air supply pipe, in which air supplied to the cathode flows. The air supply pipe may include a first inlet pipe C1, a second inlet pipe C2 and a third inlet pipe C3. Here, the first inlet pipe C1 is a pipe in which air, introduced through the first air inlet hole 133a, flows; the second inlet pipe C2 is a pipe in which air, introduced through the second air inlet hole 233a, flows; and the third inlet pipe C3 is a pipe which is connected to the first inlet pipe C1 and the second inlet pipe C2, such that the air, supplied to each of the first inlet pipe C1 and the second inlet pipe C2, flows together. That is, the air flowing in the third inlet pipe C3 may branch into the first inlet pipe C1 and the second inlet pipe C2, respectively, to pass through the first air inlet hole 133a and the second air inlet hole 233a.

The first air discharge hole 133b and the second air discharge hole 233b may communicate with each other through an air discharge pipe, in which air passing through the cathode flows. The air discharge pipe may include a first discharge pipe C11, a second discharge pipe C12 and a third discharge pipe C13. Here, the first discharge pipe C11 is a pipe in which air, discharged from the first air discharge hole 133b, flows; the second discharge pipe C12 is a pipe in which air, discharged from the second air discharge hole 233b, flows; and the third discharge pipe C13 is a pipe which is connected to the first discharge pipe C11 and the second discharge pipe C12, such that the air, supplied from each of the first discharge pipe C11 and the second discharge pipe C12, flows together. That is, the air, passing through each of the first air discharge hole 133b and the second air discharge hole 233b, passes through the first discharge pipe C11 and the second discharge pipe C12, and then is joined together to pass through the third discharge pipe C13.

That is, the first stack 100 and the second stack 200 are connected in parallel to each other on an air supply side through the first air inlet hole 133a and the second air inlet hole 233a; and the first stack 100 and the second stack 200 may be connected in parallel to each other on an air discharge side through the first air discharge hole 133b and the second air discharge hole 233b.

Accordingly, supply and discharge of air in each of the first stack 100 and the second stack 200 may be performed in parallel, such that air flow resistance may be minimized compared to a case where supply and discharge of air is performed in series. Further, performance of a fuel cell device may be improved by minimizing parasitic power of a blower which, as Balance of Plant (BOP), circulates air passing through the cathodes of the first stack 100 and the second stack 200.

In addition, the first fuel inlet hole 132a may be disposed below (i.e., −Z axis direction) the first fuel discharge hole 132b, and the second fuel inlet hole 232a may be disposed below (i.e., −Z axis direction) the second fuel discharge hole 232b. In this case, the first fuel discharge hole 132b and the second fuel inlet hole 232a may communicate with each other through a connection pipe A2, in which fuel discharged from the first fuel discharge hole 132b flows. More specifically, after fuel flowing in a first fuel pipe A1 is introduced into the first fuel inlet hole 132a, the fuel may be discharged from the first fuel discharge hole 132 to flow in the connection pipe A2. Here, after the fuel flowing in the connection pipe A2 is introduced into the second fuel inlet hole 232a, the fuel may be discharged from the second fuel discharge hole 232b.

That is, the first stack 100 and the second stack 200 may be connected in series to each other on a fuel supply and discharge side through the first fuel discharge hole 132b and the second fuel inlet hole 232a.

Accordingly, supply and discharge of the fuel in each of the first stack 100 and the second stack 200 may be performed in series, such that a number of fuel cells included in each of the first stack 100 and the second stack 200 may be adjusted, thereby effectively providing the same or similar charging ratio of fuel (i.e., hydrogen) in each stack.

Figure 4:
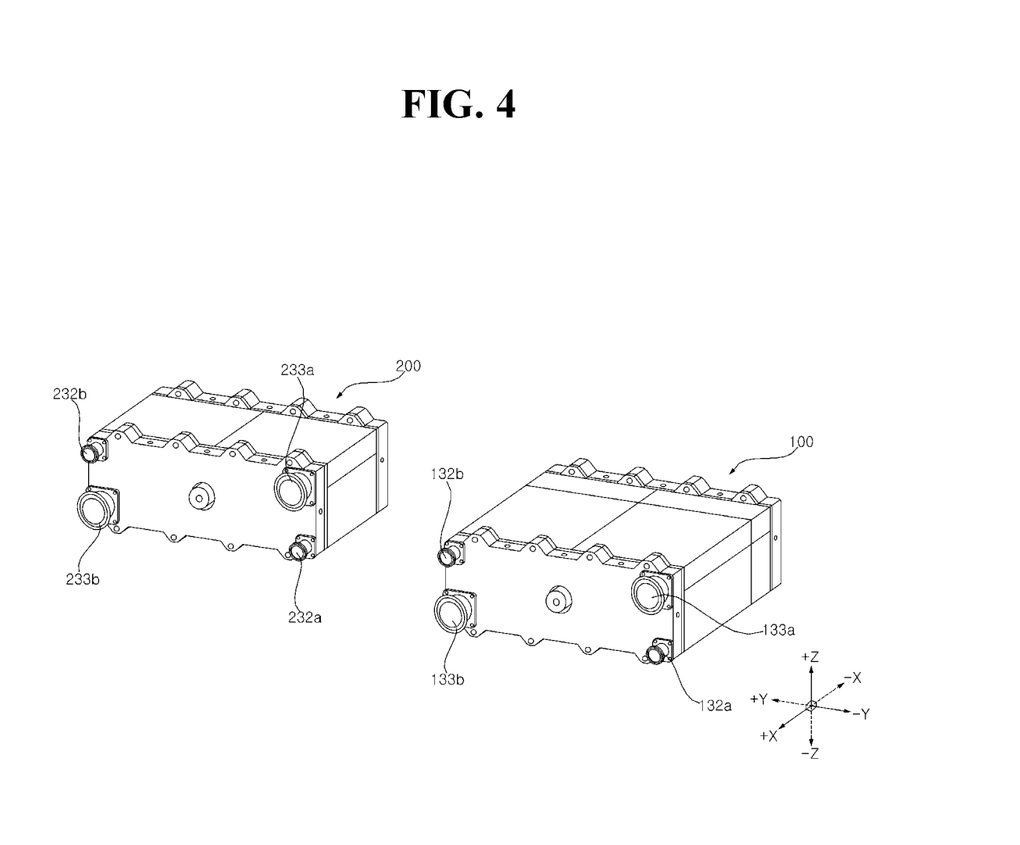
FIG. 4 is a diagram illustrating separately a first stack and a second stack of a fuel cell stack according to an embodiment of the present disclosure.
Figure 5:
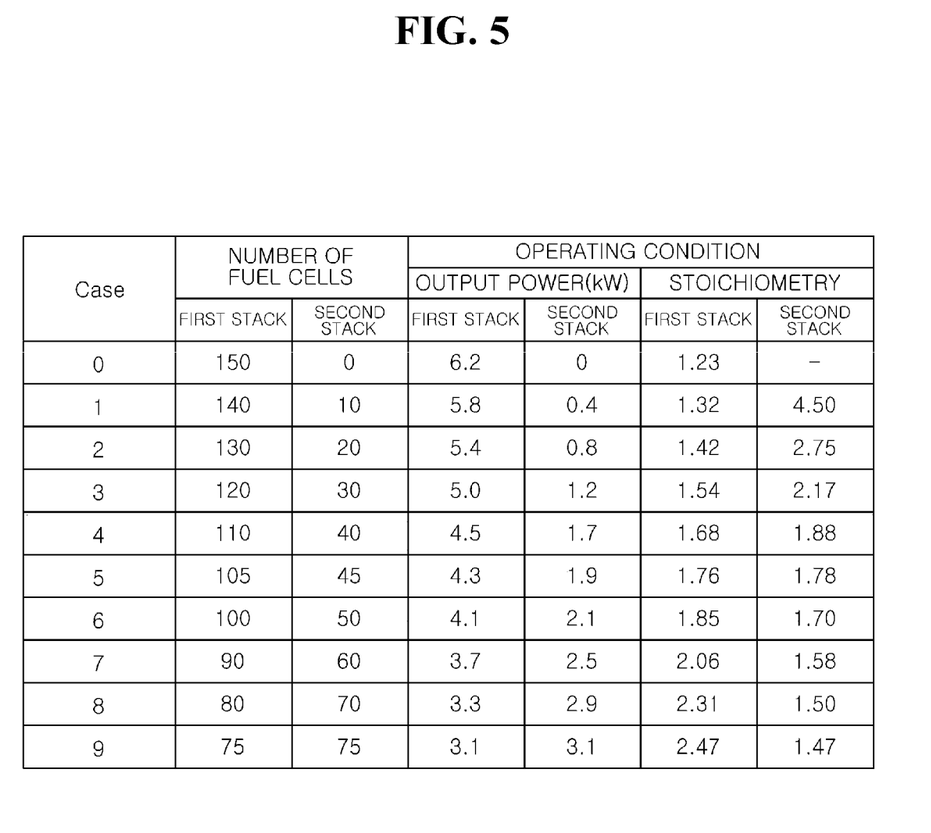
FIG. 5 is a diagram illustrating a table showing results of experiments conducted by varying a number of fuel cells included in a fuel cell stack according to an embodiment of the present disclosure.

FIG. 4 is a diagram illustrating separately a first stack and a second stack of a fuel cell stack according to an embodiment of the present disclosure. FIG. 5 is a diagram illustrating a table showing results of experiments conducted by varying a number of fuel cells included in a fuel cell stack according to an embodiment of the present disclosure.

Referring to FIGS. 2 and 5, a reference condition is set such that when a general fuel cell stack is formed with one layer, an area of fuel cells 11 is 200 m$^2$, a number of the fuel cells 11 is 150, a cell voltage of the fuel cells 11 is 0.75 V and output power is 6.2 kW, a charging ratio of a supplied amount of hydrogen (hereinafter referred to as a reference amount of hydrogen) to an actually required amount of hydrogen for the above chemical reaction in the fuel cells 11 is 1.23 (i.e., 185/150) (i.e., "Case 0" in FIG. 5).

Referring to FIGS. 4 and 5, in the case where 150 fuel cells of the fuel cell stack are divided into two stacks, a charging ratio of hydrogen is as follows. Here, after the fuel (hydrogen) is primarily consumed in the first stack 100, the fuel (hydrogen) is then supplied to the second stack 200 through the connection pipe A2 which communicates the first fuel discharge hole 132b with the second fuel inlet hole 232a, as described above.

In the case where a number of the first fuel cells 110 is 140 and a number of the second fuel cells 210, is 10, and the reference amount of hydrogen is supplied, a charging ratio of hydrogen is 1.32 (i.e., 185/140) in the first stack 100 and 4.50 (i.e., (185−145)/10) in the second stack 200 ("Case 1" in FIG. 5).

In the case where a number of the first fuel cells 110 is 130 and a number of the second fuel cells 210, is 20, and the reference amount of hydrogen is supplied, a charging ratio of hydrogen is 1.42 (i.e., 185/130) in the first stack 100 and 2.75 (i.e., (185−130)/20) in the second stack 200 ("Case 2" in FIG. 5).

"Case 3" and "Cases 7 to 9" in FIG. 5 may be obtained in the same manner as above, and it can be seen from "Cases 1 to 3" and "Cases 7 to 9" that there is a relatively large difference between a charging ratio of hydrogen in the first stack 100 and a charging ratio of hydrogen in the second stack 200. However, such large difference between the charging ratios of hydrogen in the first stack 100 and the second stack 200 may result in a large difference in performance between the first stack 100 and the second stack 200, thereby making it difficult to manage the system and reducing operational reliability.

Accordingly, the number of fuel cells 110 in the first stack 110 may be greater than the number of fuel cells 210 of the second stack 200 by a predetermined ratio (i.e., a ratio at which there is no difference between the charging ratios of hydrogen in the first stack 100 and the second stack 200 or the difference is less than a predetermined value), in which the first stack 110 is located at a lower position of the two-layer fuel cell stack and to which the fuel (hydrogen) is first supplied, and the second stack 200 is located at an upper position of the two-layer fuel cell stack and to which residual fuel (hydrogen), remaining after the fuel is consumed by the first stack 100, is supplied. For example, the number of first fuel cells 110 may be 2.0 to 2.7 times greater than the number of second fuel cells 210.

That is, in the case where the number of the first fuel cells 110 is 110 and the number of the second fuel cells 210 is 40, and the reference amount of hydrogen is fed, the charging ratio of hydrogen in the first stack 100 may be 1.68 (i.e., 185/110), and the charging ratio of hydrogen in the second stack 200 may be 1.88 (i.e., (185−110)/40) ("Case 4" of FIG. 5).

Further, in the case where the number of the first fuel cells 110 is 105 and the number of the second fuel cells 210 is 45, and the reference amount of hydrogen is fed, the charging ratio of hydrogen in the first stack 100 may be 1.76 (i.e., 185/105), and the charging ratio of hydrogen in the second stack 200 may be 1.78 (i.e., (185−105)/45) ("Case 5" of FIG. 5).

"Case 6" in FIG. 5 may be obtained in the same manner as above, and it can be seen from "Cases 4 to 6" that there is a relatively small difference between a charging ratio of hydrogen in the first stack 100 and a charging ratio of hydrogen in the second stack 200. That is, such small difference between the charging ratios of hydrogen in the first stack 100 and in the second stack 200 allows for uniform performance in the first stack 100 and the second stack 200, thereby facilitating system management and increasing operational reliability.

In addition, each of the first stack 100 and the second stack 200 may have coolant holes 135 and 235 including coolant inlet holes 135a and 235a, through which a coolant to be fed into each of the first stack 100 and the second stack 200 is introduced, and coolant discharge holes 135b and 235b, through which the coolant, passing through each of the first stack 100 and the second stack 200, is discharged. In this case, the coolant hole 135 of the first stack 100 may be formed on the other side of the first end plate 134, and the coolant hole 235 of the second stack 200 may be formed on the other side of the second end plate 234. Here, the coolant may serve to cool the stacks 100 and 200.

The fuel cell stack according to the present disclosure has one or more of the following effects.

First, by dividing the fuel cell stack into two stacks, a charging ratio of hydrogen at the anodes of the respective stacks may be increased, such that a cell voltage of the stack may be easily increased, compared to a one-layer fuel cell stack.

Secondly, by dividing the fuel cell stack into two stacks, hydrogen may be supplied using a reformer having a further compact design compared to a one-layer fuel cell stack, such that system construction costs may be reduced, and the system may occupy a smaller volume.

Thirdly, by dividing the fuel cell stack into two stacks, a number of fuel cells per stack may be reduced compared to a one-layer stack, thereby reducing flooding in the fuel cell stack.

Fourthly, by dividing the fuel cell stack into two stacks, fuel (hydrogen) is supplied in series to each of the two stacks, while a number of fuel cells in one stack is different from a number of fuel cells in the other, such that uniform performance may be achieved on each of the stacks.

Fifthly, by dividing the fuel cell stack into two stacks, air (oxygen) is supplied in parallel to each of the two stacks, such that parasitic power of a blower for circulating air may be minimized.

Sixthly, the air inlet hole, through which air to be supplied to the cathode is introduced, is disposed above the air discharge hole, through which the air passing through the cathode is discharged, such that condensate water may be easily discharged.

While the fuel cell stack according to the embodiments of the present disclosure has been described above with reference to the accompanying drawings, it should be understood that the present disclosure is not limited to the aforementioned embodiments, and various modifications and equivalent embodiments may be possible without departing from the scope and spirit of the invention as defined by the appended claims. Therefore, the scope of the present disclosure should be limited only by the accompanying claims and equivalents thereof.

What is claimed is:
1. A fuel cell stack included in a fuel cell device and configured to produce power, the fuel cell stack comprising:
   a first stack including a plurality of first fuel cells that are stacked on top of each other; and
   a second stack including a plurality of second fuel cells that are stacked on top of each other, the second stack being disposed adjacent to the first stack, wherein the first stack comprises:
- a first fuel inlet hole configured to supply fuel to anodes of the first stack,
- a first fuel discharge hole configured to discharge the fuel passing through the anodes of the first stack,
- a first air inlet hole configured to supply air to cathodes of the first stack, and
- a first air discharge hole configured to discharge the air passing through the cathodes of the first stack, wherein the second stack comprises:
- a second fuel inlet hole configured to supply fuel to anodes of the second stack,
- a second fuel discharge hole configured to discharge the fuel passing through the anodes of the second stack,
- a second air inlet hole configured to supply air to cathodes of the second stack, and
- a second air discharge hole configured to discharge the air passing through the cathodes of the second stack, and wherein the fuel cell stack further comprises:
- a connection pipe that connects the first fuel discharge hole to the second fuel inlet hole,
- an air supply pipe that defines an air inlet connected to both of the first air inlet hole and the second air inlet hole, and
- an air discharge pipe that defines an air outlet connected to both of the first air discharge hole and the second air discharge hole.

2. The fuel cell stack of claim 1, wherein:
the first stack further comprises a first cell housing that receives the plurality of first fuel cells, and a first end plate that is connected to the first cell housing, the first end plate defining the first fuel inlet hole, the first fuel discharge hole, the first air inlet hole, and the first air discharge hole; and
the second stack comprises a second cell housing that receives the plurality of second fuel cells, and a second end plate that is connected to the second cell housing, the second end plate defining the second fuel inlet hole, the second fuel discharge hole, the second air inlet hole, and the second air discharge hole.

3. The fuel cell stack of claim 2, wherein:
the first stack is disposed below the second stack; and
a number of the first fuel cells is greater than a number of the second fuel cells by a predetermined ratio.

4. The fuel cell stack of claim 3, wherein the number of the first fuel cells is 2.0 to 2.7 times greater than the number of the second fuel cells.

5. The fuel cell stack of claim 3, wherein the first stack has:
- first fuel holes including the first fuel inlet hole and the first fuel discharge hole, and
- first air holes including the first air inlet hole and the first air discharge hole, wherein the second stack has:
- second fuel holes including the second fuel inlet hole and the second fuel discharge hole, and
- second air holes including the second air inlet hole and the second air discharge hole, and wherein the second fuel holes and the second air holes of the second stack are defined on a side surface of the second end plate that is located adjacent to a side surface of the first end plate that defines the first fuel holes and the first air holes of the first stack.

6. The fuel cell stack of claim 5, wherein:
the first fuel inlet hole is disposed adjacent to the first air inlet hole;
the first fuel discharge hole is disposed adjacent to the first air discharge hole;
the second fuel inlet hole is disposed adjacent to the second air inlet hole; and
the second fuel discharge hole is disposed adjacent to the second air discharge hole.

7. The fuel cell stack of claim 6, wherein each of the first fuel inlet hole and the second fuel inlet hole is disposed below the first fuel discharge hole and the second fuel discharge hole, respectively.

8. The fuel cell stack of claim 6, wherein each of the first air inlet hole and the second air inlet hole is disposed above the first air discharge hole and the second air discharge hole, respectively.

9. The fuel cell stack of claim 1, wherein the air supply pipe comprises:
- a first inlet pipe configured to supply air to the first air inlet hole;
- a second inlet pipe configured to supply air to the second air inlet hole; and
- a third inlet pipe that is connected to the first inlet pipe and the second inlet pipe and that is configured to supply air to each of the first inlet pipe and the second inlet pipe, the third inlet pipe defining the air inlet, and wherein the air discharge pipe comprises:
- a first discharge pipe configured to receive air discharged from the first air discharge hole,
- a second discharge pipe configured to receive air discharged from the second air discharge hole, and
- a third discharge pipe that is connected to the first discharge pipe and the second discharge pipe and that is configured to receive air, discharged from each of the first discharge pipe and the second discharge pipe, the third discharge pipe defining the air outlet.

10. The fuel cell stack of claim 3, wherein the first stack further comprises:
- a pair of first end plates disposed at ends of the first cell housing, respectively, the first end plate being one of the pair of first end plates; and
- a plurality of first connecting bars that connect the pair of first end plates to each other, and wherein the second stack further comprises:
- a pair of second end plates disposed at ends of the second cell housing, respectively, the second end plate being one of the pair of second end plates, and
- a plurality of second connecting bars that connect the pair of second end plates to each other.

11. The fuel cell stack of claim 10, wherein:
the first end plate has a plurality of first coupling holes that are coupled to the plurality of first connecting bars, respectively;
the second end plate has a plurality of second coupling holes that are coupled to the plurality of second connecting bars, respectively;
at least one of the plurality of first coupling holes faces one of the plurality of second coupling holes such that one of the plurality of first connecting bars is coupled to one of the plurality of second connecting bars.

12. The fuel cell stack of claim 3, further comprising a holder that is disposed between the first stack and the second stack and that supports the second stack.

13. The fuel cell stack of claim 3, wherein the first stack further comprises first coolant holes including a first coolant inlet hole configured to supply a first coolant to the first stack and a first coolant discharge hole configured to discharge the first coolant passing through the first stack, wherein the second stack further comprises second coolant holes including a second coolant inlet hole configured to supply a second coolant to the second stack and a second coolant discharge hole configured to discharge the second coolant passing through the second stack, wherein the first fuel inlet hole, the first fuel discharge hole, the first air inlet hole, and the first air discharge hole are defined at a first side of the first stack, wherein the first coolant inlet hole and the first coolant discharge hole are defined at a second side of the first stack facing the first side of the first stack, wherein the second fuel inlet hole, the second fuel discharge hole, the second air inlet hole, and the second air discharge hole are defined at a first side of the second stack, and wherein the second coolant inlet hole and the second coolant discharge hole are defined at a second side of the second stack facing the first side of the second stack.

14. The fuel cell stack of claim 1, wherein the connection pipe is configured to guide the fuel discharged from the first fuel discharge hole to the second fuel inlet hole.

15. The fuel cell stack of claim 14, wherein the second stack is disposed above an upper surface of the first stack, and the connection pipe is inclined with respect to the upper surface of the first stack.

16. The fuel cell stack of claim 1, wherein the air supply pipe is configured to guide air toward the first air inlet hole and the second air inlet hole parallel to each other, and wherein the air discharge pipe is configured to guide air discharged from the first air discharge hole and the second air discharge hole in parallel to each other.

17. The fuel cell stack of claim 1, wherein the connection pipe is inclined with respect to each of the air supply pipe and the air discharge pipe.

* * * * *